United States Patent [19]
Mason et al.
[11] 4,114,137
[45] Sep. 12, 1978

[54] DIRECTIONAL SONOBUOY

[75] Inventors: Russell I. Mason, Doylestown; John R. Dale, Willow Grove, both of Pa.

[73] Assignee: The United States of America as represented by the Secretary of the Navy, Washington, D.C.

[21] Appl. No.: 535,332

[22] Filed: Dec. 19, 1974

[51] Int. Cl.[2] ............ G01V 1/00
[52] U.S. Cl. ............ 340/85; 9/8 R
[58] Field of Search ............ 9/8 R; 340/8 S, 2, 8, 340/10, 13; 181/142

[56] References Cited

U.S. PATENT DOCUMENTS

| | | | |
|---|---|---|---|
| 768,568 | 8/1904 | Mundy | 340/13 R |
| 1,345,717 | 7/1920 | Thomas | 340/13 R |
| 3,382,481 | 5/1968 | Baker | 340/10 |
| 3,803,540 | 4/1974 | Mar et al. | 340/8 S |
| 3,864,771 | 2/1975 | Bauer et al. | 9/8 R |

*Primary Examiner*—Samuel Feinberg
*Attorney, Agent, or Firm*—R. S. Sciascia; Henry Hansen

[57] ABSTRACT

A sonobuoy having a directional hydrophone centrally enclosed in a flexible, acoustically transparent, spherical bag which upon deployment is filled with water to form a hydrosphere. A first embodiment comprises a plurality of upper and lower spreaders which form the bag into a spherical shape having a valve at the bottom most portion thereof for entry of water into the bag during oscillatory motion of the hydrophone. A second embodiment comprises a flexible, acoustically transparent, spherical bag which is time-filled with water by a pump to inflate the bag to a predetermined pressure. The hydrosphere forms a large virtual mass of static water around the hydrophone which reduces near field affects due to flow and motion noise and which also operates as a sea anchor.

2 Claims, 7 Drawing Figures

Fig. 1.
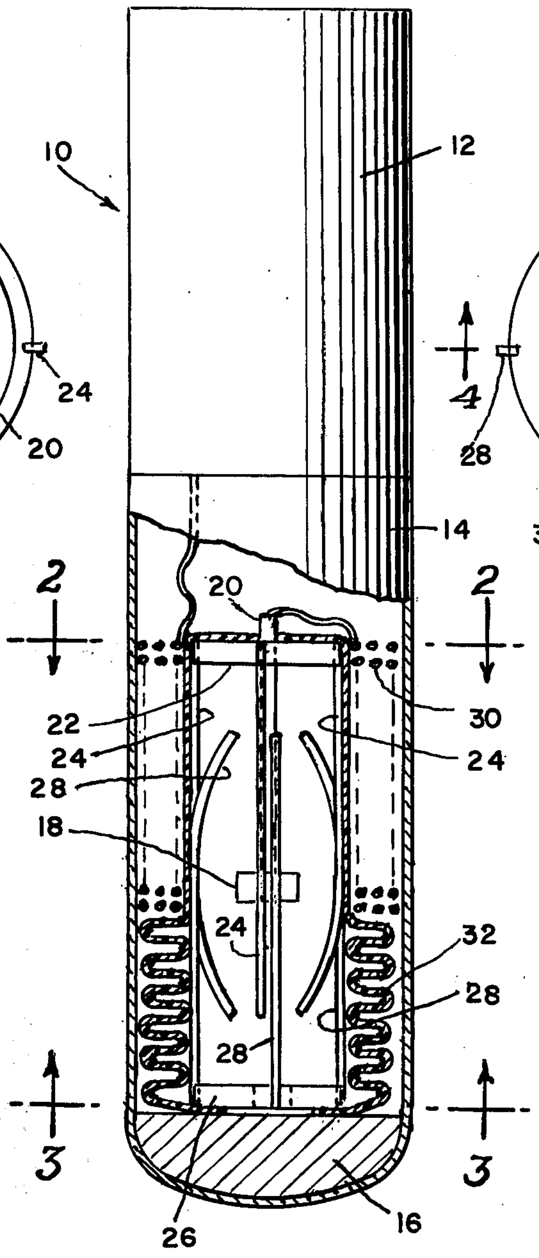
Fig. 2.
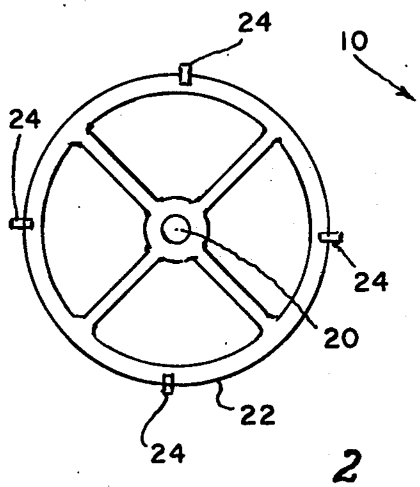
Fig. 3.
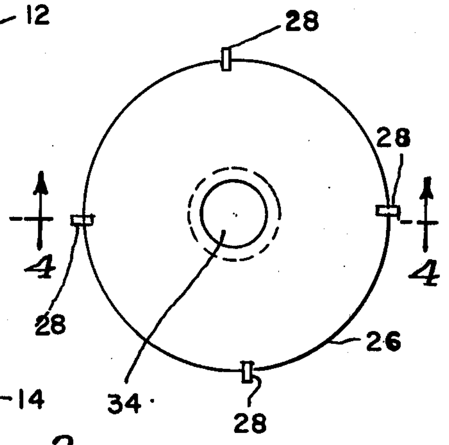
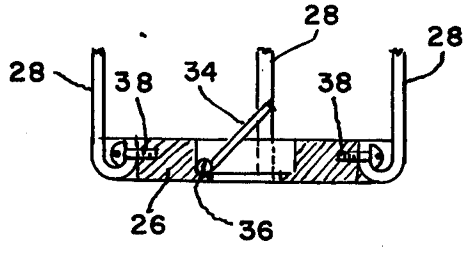
Fig. 4.

DIRECTIONAL SONOBUOY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to low noise sonobuoys and particularly to sonobuoys having a gradient hydrophone completely surrounded by a spherical flow shield which reduces the near field effects of flow and motion noise.

Directional, gradient hydrophones become extremely susceptible to near field effects of flow and motion noise when deployed in a water body. Accordingly, it is desirable to reduce near field noise as much as possible within the immediately surrounding environment and to stablize the motion of the hydrophone within the water body. Prior art hydrophone devices have utilized rigid containers both in spherical and a cylindrical forms to house a hydrophone which is immersed in a liquid. Such devices large enough to keep moving water well away from the hydrophone surfaces are not easily packageable in a conventional sonobuoy canister either because of rigidity or size and often restricted the directional sensitivity of the hydrophone.

SUMMARY OF THE INVENTION

Accordingly, it is an object of the present invention to provide a flexible, acoustically transparent, spherical, water-filled flow shield which centrally encloses a hydrophone and which, by keeping moving water well away from the hydrophone, reduces near field flow noise effects. Another object of the invention is to provide a hydrophone flow shield which is conveniently packageable within a sonobuoy canister. Yet another object of the invention is to provide a hydrophone flow shield which, when filled with water, provides a large virtual mass which is formed around the hydrophone to act as a stablizing sea anchor.

Briefly, these and other objects are accomplished by a flexible, acoustically transparent, spherical bag which at its center encloses a directional, gradient hydrophone. The flexible bag is conveniently packaged within a sonobuoy canister and, upon removal from the canister in normal deployment, is expanded to form a sphere which when filled with water comprises a hydrosphere having the hydrophone at its center. In one embodiment of the invention, the packaged bag is deployed into a sperical shape with the assistance of a plurality of upper and lower spreaders which emanate radially about two spherical areas diametrically opposed from one another. In this embodiment, the spreader support spherical bag is filled with water by means of a flapper valve located at the bottom of the bag and which allows the entry of water aided by the normal oscillatory motion of the hydrosphere. As water enters the bag through the valve, entrapped air is pushed upwards and escapes through a plurality of holes placed near the top of the hydrosphere. In another embodiment, the deflated bag, upon removal from the canister, is filled by means of an internal pump which is operatively connected to a timer so that complete filling of the bag by water is ensured. A pressure sensitive pop valve senses the water pressure within the bag and provides a release mechanism for water and air to flow out of the bag should the hydrosphere tend to be overinflated. The hydrosphere forms a large virtual mass about the enclosed hydrophone and effectively removes the near field effects of flow and motion noise away from the hydrophone surfaces. The hydrosphere also provides a sea anchor effect which tends to stabilize the motion of the hydrophone within the water body.

For a better understanding of these and other aspects of the invention, reference may be made to the following detailed description taken in conjunction with the accompanying drawings.

BRIEF DESCRIPTION OF THE DRAWINGS

FIG. 1 is a diagram of a sonobuoy having a cutaway view of the invention in its packaged form;

FIG. 2 is a top view of the upper spreader assembly as used within the invention shown in FIG. 1;

FIG. 3 is a bottom view of the lower spreader assembly as used within the invention shown in FIG. 1;

FIG. 4 is a cross-section of a valve within the lower spreader assembly shown in FIG. 3;

DESCRIPTION OF THE PREFERRED EMBODIMENT

Figure 5:
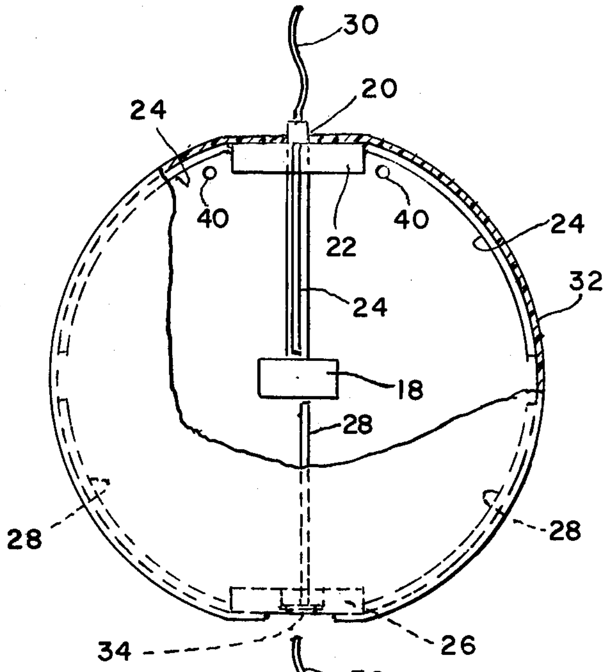
FIG. 5 is a cutaway view of a deployed hydrosphere having a valve as used within one embodiment of the invention.

Directional, gradient hydrophones of either the pressure or velocity sensitive type exhibit great sensitivity to near field (including contact) sources of flow or motion noise. A hydrophone, suspended alone in a water body, will cause eddies to form on the down flow side of the hydrophone and which correspondingly generates a variety of noise sources adjacent to the hydrophone due to the separation of the water flow from the hydrophone surface. The eddies act like near field sound sources and a gradient hydrophone which is excited by such near field sources becomes supersensitive due to the spherical nature of the exciting wavefront. This supersensitivity is known as the "Bass Boost" effect at low frequency regions. The direct contact of flowing water on the hydrophone surface also produces noise. The present invention places a spherical, water-filled flowshield about the suspended hydrophone thereby repositioning the eddies to the surface of the flowshield and, accordingly, reducing the effects of the near field sources mentioned hereinabove. The flowshield is made of an acoustically transparent material operable at frequencies to less than 1 hertz and which is non-transmissive to the flow of water.

Referring now to FIG. 1, there is shown a sonobuoy 10 having an upper detachable section 12 and a lower section 14 capped at its bottom end by a weighting material 16 formed into a hemispherical nose. Packaged into the lower section 14 is a directional, gradient hydrophone 18 supported by a rod 20 which passes through the center of, and attached to, an upper spreader support ring 22. Radially mounted about the outer circumference of the upper support ring 22 are four spreaders 24 spaced at equal distances. Toward the bottom of the section 14 and adjacent to the weighting material 16 is a lower spreader support ring 26 having a series of four spreaders 28 equally spaced around the outer circumference thereof. When packaged in the lower section 14, the upper spreaders 24 and the lower spreaders 28 are interstitially positioned so as not to interfere with one another. A support cable 30 is internally coiled within the lower section 14 and both restricts and positions the location of the upper and lower spreaders as they lay packed within the sonobuoy 10. Sealingly connected to the support rod 20 at the top of the upper ring 22 is an inflatable, spherical bag 32 which encloses the hydrophone 18, a portion of the support rod 20, the upper ring 22 and associated spreaders 24, and the lower ring 26 and associated spreaders 28. The bag 32 is folded for the most part in the lower portion of the section 14 and is sealingly connected in a circumferential manner to the bottom edge of the lower ring 26.

Referring now to FIG. 2, there is shown a magnified view of the upper ring 22 as would be seen looking downward from the top of the sonobuoy 10 and without the interconnected inflatable bag or surrounding cable. The upper support ring 22 is formed from a spoke-like wheel having a central hub through which is passed the rod 20 and which is fixably attached thereto. Spaced about the outer circumference of the ring 22 are the spreaders 24 which are each fixed to the ring in a manner which will be described hereinafter.

Referring now to FIG. 3, there is shown a magnified view of the lower ring 26 as would be viewed looking upwards from the nose end of the sonobuoy 10 and without the interconnecting inflatable bag. Lower ring 26 is preferably a solid piece of circular material having the four lower spreaders 28 spaced equidistant around the outer circumference thereof. Located at the center of the ring 26 is a flapper valve 34 which will be hereinafter described.

Referring now to FIG. 4, there is shown the manner of interconnection between the lower ring 26, the lower spreaders 28, and the flapper valve 34. Four rectangular notches are each cut from a portion of the lower ring 26 to coincide with the respective positions of each of the spreaders 28. The surface of each notch nearest the center of the lower ring 26 is drilled and tapped to accept a screw 38 which passes through one end of each of the respective spreaders 28 and individually attaches each spreader to the ring 26. After attachment of the spreader 28 to the ring 26, the spreader is bent over itself thus effectively covering the head of the screw 38. The upper and lower spreaders 24, 28 are made from conventional spring type material thereby providing a tendency for each of the spreaders to spring in an outward direction away from the respective centers of each of the rings. The upper spreaders 24 are fixed in a similar manner to the upper ring 22 shown in FIG. 2. Referring again to FIG. 4, the flapper valve 34 rotates about a hinge 36 and, when in a closed position, the valve 34 rests upon a seat formed from an annular boss around the center of the lower ring 26 as shown by the dotted lines in FIG. 3.

Referring now to FIG. 5 there is shown a cutaway view of a first embodiment of the invention utilizing the flapper valve 34 shown in FIG. 4. The hydrophone 18 is supported at the center of the water-filled sphere by the rod 20 which passes through the center of the upper ring 22. Springing radially from the outer periphery of the ring 22 are the upper spreaders 24. Similarly, lower spreaders 28 spring radially from the outer periphery of the lower ring 26 having the flapper valve 34 at its center. The bag 32 is formed into a sphere by the spring action of the upper and lower spreaders and by the contours of the bag itself. The cable 30 is attached to the rod 20 for support of the hydrosphere.

Figure 6:
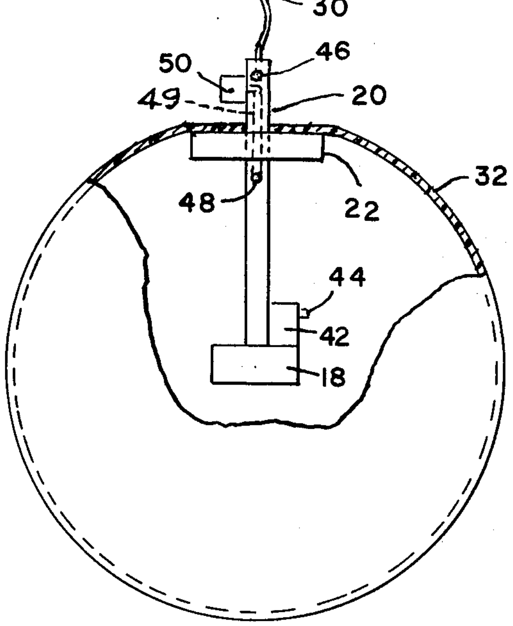
FIG. 6 is a cutaway view of a deployed hydrosphere having an internal pump as used within another embodiment of the present invention.

Referring now to FIG. 6 there is shown a cutaway view of a second embodiment of the invention having an internal pump 42 positioned on the top of the hydrophone 18 and attached to the pipe 20. The pump 42 is connected to an opening 46 in the rod 20 by means of a pipe 49 within the rod 20 and which enables the pump 42 to draw water from outside the bag 32 and inflate the bag by means of releasing water from an outlet 44 attached to the pump 42. An opening 48 is provided on the rod 20 within the enclosed portion of the bag 32 and which is connected by a hollow portion within the rod 20 to a pop valve 50 attached to a portion of the rod 20 not enclosed by the bag 32. The cable 30 is connected to the rod 20 for support of the hydrosphere.

Referring now to FIG. 1 in conjunction with FIGS. 4 and 5, the operation of one embodiment of the present invention will now be explained. As the sonobuoy 10 is dropped into the water body and the buoy begins to assume its deployed position, the upper section 12 which typically contains an electronic package, a power source, a floatation device, and an antenna is caused to be separated from the lower section 14 in any convenient manner such as squib charge. Once separated, the cable 30 begins paying out due to the reactive forces between the float within the upper section 12 and the weight of the lower section 14. When the cable 30 is fully payed out, the support rod 20 and inflatable bag 32 containing all of the enclosed spreading apparatus and hydrophone is pulled from the lower section 14 container and the inflatable bag 32 assumes its deployed spherical shape with the lower section 14 container sinking to the bottom of the water body. Referring now to FIG. 5, the upper and lower spreaders 24, 28, which are no longer restricted by a container, each spring radially outward within the confinement of the inflatable bag 32 so as to cause the bag 32 to substantially form a sphere. The hydrophone 18 is fixably positioned at the center of the inflated bag 32 by the rod 20. Another method (not shown) of centrally fixing the hydrophone within the bag is to support the hydrophone between two compliant cords, substantially equal in length, thereby further insulating the hydrophone from movement of the hydrosphere. Once supported by the upper and lower spreaders 24, 28 the bag 32 begins to fill with water by means of the valve 34 which is caused to open by the oscillatory motion of the spread open bag within the water. As the inflated bag 32 fills with water, any trapped air is forced upwards toward the top of the bag at upper ring 22 and surrounding which is a plurality of openings 40 through the bag 32 which allows the trapped air to escape and the bag to fill completely with water. Alternatively, a second flapper valve (not shown) may be positioned at the top of the bag 32 to allow the egress of entrapped air from the inflated bag. When the bag 32 is fully inflated with water and forms a hydrosphere, there is a large virtual mass of static water which completely surrounds the enclosed hydrophone 18 and which, for reasons earlier mentioned, provides a substantial reduction in flow and motion noise detected by the hydrophone. Additionally, the large virtual mass of entrapped water acts as a sea anchor about the hydrophone which tends to stabilize the movement of the hydrophone within the water body.

Figure 7:
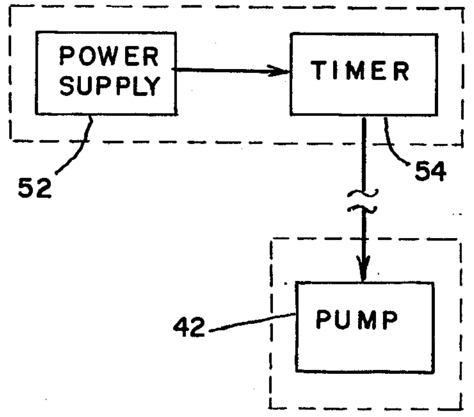
FIG. 7 is a block diagram of electrical signals for operation of the pump shown in FIG. 6.

Referring now to FIG. 6 in conjunction with FIG. 7 the operation of a second embodiment of the present invention will now be explained. The pump 42 is connected to the opening 46 within the rod 20 by the connecting pipe 49 internal to the rod 20 and which allows the pump 42 to draw water into the opening 46 and discharge the drawn water from the pump outlet 44 into the interior of the bag 32. The pump 42 is predetermined to run for a limited time by means of a timer 54 shown in FIG. 7 and which, along with a power supply 52, may be conveniently stored in the upper section 12 of the sonobuoy 10 shown in FIG. 1. The power for the pump 42 may be supplied, for example, by the cable 30. The pump 42 is therefore operated for a sufficiently long period of time to inflate the bag 32 to a spherical shape. In order to pressurize the bag 32 at the desired level, the opening 48 in the rod 20 conducts water from within the inflated bag 32 by means of a hollowed out portion of the rod 20 to the pop valve 50 which is set to a predetermined pressure differential. As the bag 32 tends to overinflate, the pop valve 50 will allow water and entrapped air to escape outside the inflated bag until such time as the pump 42 shuts down and the bag pressure is accordingly reduced. At this time, the valve 50 closes thereby preventing further escape of water from the inflated bag 32 and thus maintaining the bag 32 in a spherically inflated state. The hydrophone 18 is centrally positioned within the spherical inflated bag 32 by the rod 20 and the bag 32 relies on internal water pressure to maintain the spherical shape. Similar to the first noted embodiment shown in FIG. 5, the present embodiment maintains a large virtual mass of static water formed into a sphere which centrally enclosed the hydrophone 18. Accordingly, both flow and motion noise are substantially reduced in the area near the hydrophone and the large virtual water mass acts as a sea anchor which tends to stabilize the position of hydrophone 18 within the water body.

Thus it may be seen that there has been provided a novel flow shield for a directional, gradient hydrophone which is easily packageable in a sonobuoy and which substantially reduces the flow and motion noise past the hydrophone. Moreover, the flow shield operates as a sea anchor to stabilize the position of the hydrophone within the water body.

Obviously, many modifications and variations of the invention are possible in light of the above teachings. For example, the flow shield can be manufactured from a cylindrically shaped material so as to be conveniently packageable within a sonobuoy canister. It is therefore to be understood that within the scope of the appended claims the invention may be practiced otherwise than as specifically described.

What is claimed is:

1. A deployable high drag, low noise hydrophone assembly, in combination, comprising:
- a hydro-acoustic transducer formed to be electrically connected to a signal processor;
- a non-porous inflatable globular bag transparent to acoustic energy secured to and centrally enclosing said transducer;
- spreading means opposingly connected to the upper and lower portions of said bag for urging said bag into the globular configuration; and
- filling means having a flapper valve operatively connected to the lower portion of said bag and responsive to the oscillatory motion thereof for filling said bag with water upon deployment.

2. A deployable high drag, low noise hydrophone assembly, in combination, comprising:
- a hydro-acoustic transducer formed to be electrically connected to a signal processor;
- a non-porous inflatable globular bag transparent to acoustic energy secured to and centrally enclosing said transducer;
- spreading means opposingly connected to the upper and lower portions of said bag for urging said bag into the globular configuration, each of said upper and lower spreading means including ring means connected at the center thereof to said bag and a plurality of flexible ribs positioned within said bag and having respective ribs attached to the outer circumference of the corresponding ring means at equal spacings thereof for spreading the upper portion of said bag into a first hemiglobular configuration and the lower portion of said bag into a second hemiglobular configuration inverted relative to said first configuration; and
- filling means connected to said bag at the lower portion thereof for filling said bag with water upon deployment.

* * * * *